(12) United States Patent
Avidan et al.

(10) Patent No.: US 7,929,804 B2
(45) Date of Patent: Apr. 19, 2011

(54) SYSTEM AND METHOD FOR TRACKING OBJECTS WITH A SYNTHETIC APERTURE

(75) Inventors: Shmuel Avidan, Brookline, MA (US); Wojciech Matusik, Lexington, MA (US); Neel S. Joshi, La Jolla, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 867 days.

(21) Appl. No.: 11/866,645

(22) Filed: Oct. 3, 2007

(65) Prior Publication Data

US 2009/0092282 A1    Apr. 9, 2009

(51) Int. Cl.
*G06K 9/32* (2006.01)
(52) U.S. Cl. ............ 382/294; 345/427; 356/12; 702/152
(58) Field of Classification Search .................. 382/100, 382/106, 154, 276, 282, 291, 294; 345/419–427, 345/653, 664; 356/12; 715/757, 782, 848; 702/152
See application file for complete search history.

(56) References Cited

U.S. PATENT DOCUMENTS

| | | | | |
|---|---|---|---|---|
| 4,645,459 A | * | 2/1987 | Graf et al. ........................ | 434/43 |
| 5,745,126 A | * | 4/1998 | Jain et al. ....................... | 382/154 |
| 5,850,352 A | * | 12/1998 | Moezzi et al. ................. | 345/419 |
| 6,445,815 B1 | * | 9/2002 | Sato .............................. | 382/154 |
| 7,420,590 B2 | * | 9/2008 | Matusik et al. ................ | 348/159 |
| 7,623,676 B2 | * | 11/2009 | Zhao et al. ..................... | 382/103 |
| 2010/0166294 A1 | * | 7/2010 | Marrion et al. ................ | 382/154 |
| 2010/0259539 A1 | * | 10/2010 | Papanikolopoulos et al. ................................. | 345/420 |

OTHER PUBLICATIONS

Vaish et al., "Reconstructing occluded surfaces using synthetic apertures: Stereo, focus and robust measures," CVPR 06, pp. 2331-2338, 2006.

* cited by examiner

*Primary Examiner* — Anand Bhatnagar
(74) *Attorney, Agent, or Firm* — Dirk Brinkman; Gene Vinokur

(57) ABSTRACT

A computer implemented method tracks 3D positions of an object moving in a scene. A sequence of images is acquired of the scene with a set of cameras such that each time instant a set of images are acquired of the scene, in which each image includes pixels. Each set of images is aggregated into a synthetic aperture image including the pixels, and the pixels in each the set of images are matched corresponding to multiple locations and multiple depths of a target window with an appearance model to determine scores for the multiple locations and multiple depths. A particular location and a particular depth having a maximal score is selected as the 3D position of the moving object.

18 Claims, 1 Drawing Sheet

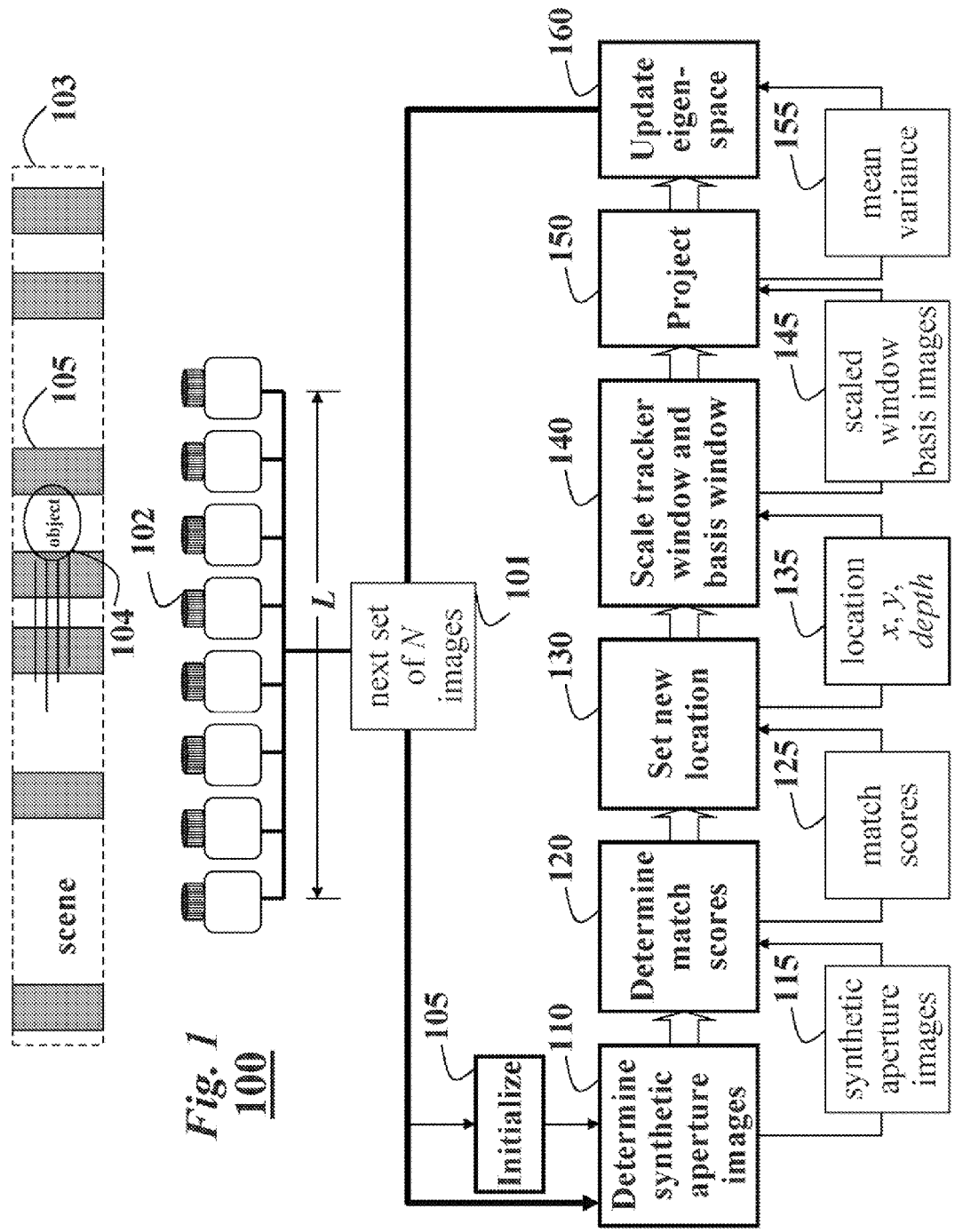

SYSTEM AND METHOD FOR TRACKING OBJECTS WITH A SYNTHETIC APERTURE

FIELD OF THE INVENTION

This invention relates generally to tracking objects in a sequence of images of a video acquired of a scene, and more particularly to tracking objects with a linear array of cameras.

BACKGROUND OF THE INVENTION

Tracking an object in a sequence of images of a video is performed in many computer vision applications. Tracking locates a region in each image that matches an appearance of a target object. Object tracking is most frequently performed with a single camera. However, one fundamental limitation of using one camera is dealing with occlusions, and accurately determining depts. With single-camera methods, occlusion can be detected on a per-pixel basis, or the position of the object can be predicated.

The problem of occlusion is addressed in several different ways. In the case of tracking with a single camera tracking, one can treat the problem implicitly or explicitly. Implicit methods use filtering methods such as Kalman filtering or particle filtering to predict the position of tile occluded object. Explicit methods often use a generative model, such as video layers or incorporate an extra hidden process for occlusion into a dynamic Bayesian network to interpret the image and to explicitly model occlusions.

With multiple cameras, one can solve the occlusion problem at the cost of introducing correspondence and assignment problems. That is, inmost conventional multi-camera systems represent the scene as a collection of 'blobs' in 3D space, which are tracked over time. This requires finding the corresponding blobs across multiple images, i.e., the correspondence problem, as well as assigning 2D blobs to the current 3D blobs maintained by the system i.e., the assignment problem.

However, arranging a multi-camera system in a geometrically complex outdoor scene may be difficult. Multiple cameras can increase the field of view of tracking systems, as well as enable triangulation of 3D positions. However, the presence of significant occlusions is still an issue.

A stereo camera can also be used for object tracking. In that case, depth is typically used as another channel in the images, and tracking is performed on a four channel image including the R, G, B colors and depth.

However, conventional stereo methods might find it difficult to obtain useful and reliable depth estimates in occluded regions, Vaish et al., "Reconstructing occluded surfaces using synthetic apertures: Stereo, focus and robust measures," CVPR 06, pages 2331-2338, 2006. They use an array of 128 cameras that is only suitable for studio settings. Their results showed that stereo reconstruction performance falls off as the amount of occlusion increases, with generally poor results with greater than 50% occlusion. It is desired to track objects in scenes with greater than 50% occlusion.

SUMMARY OF THE INVENTION

The invention provides a method for tracking 3D positions of a moving object, through dense occlusion, in 3D in a sequence of images. The 3D position is the 2D (x, y) location and depth d. The sequence of images is acquired by set of cameras arranged in a linear array. The set of cameras provide a relatively very large synthetic aperture. Thus, the invention can take advantage of parallax introduced across the baseline of the camera array when an occluder and the object are at different depths. This parallax causes different parts of the object to be occluded and unoccluded in the images acquired by the different cameras. By aggregating image data across cameras, the method can track the object even is a particular camera observes very little of the object.

The method works without performing any explicit modeling or reconstruction of the scene. The method can successfully track an object when upwards of 70% of the object is occluded in any one camera view.

BRIEF DESCRIPTION OF THE DRAWINGS

FIG. 1 is a block diagram of a linear synthetic aperture tracking method according to an embodiment of the invention.

DETAILED DESCRIPTION OF THE PREFERRED EMBODIMENTS

As shown in FIG. 1, the embodiments of our invention provide a method for tracking 3D positions of a moving object 104 in sequences of images (video) 101 acquired of a scene 103 by a set of cameras 102 arranged as a linear array. As defined herein, the 3D position consists of the 2D (x, y) location and depth d.

The set of cameras are synchronized. Each camera acquires one sequence, such that if there are N cameras, there is a set of N images at any instant in time. The scene can include significant occlusions 105. In fact, the occlusions can obscure as much as 70% of the scene.

In one embodiment, we use a linear array of eight cameras. The senor size is 640×480 pixels. The cameras have external hardware triggers and can provide synchronized video capture at up to thirty frames per second. The extrinsic and intrinsic parameters of the cameras are calibrated. The centers of projection of the cameras lie on a plane. Homographies that rectify all camera planes are determined conventionally. Color calibration can also be performed. Vignetting calibration can also be performed by imaging a constant intensity light-panel and determining per-pixel multipliers for each camera to correct for fall-off across the image plane.

FIG. 1 shows our linear synthetic aperture method 100. The method first aggregates the images 101, and then matches to locate the object 104.

An initial 2D tracking window specifies the 2D (x, y) location of the object to be tracked in the first image. This can be done manually or by some conventional object detection method. An initial depth d of the object is determined using a conventional plane-sweep procedure. The 2D (x, y) location and depth d, in combination indicate the 3D position of the object.

Starting from this initial 3D position, the object is tracked in subsequent images using an eigen-tracking approach. The method perform matching to a linear subspace that is trained to model the appearance of the object. The appearance model is in the form of the eigenspace. This model is learned on-line, as each set of images is processed.

The set of cameras 102 acquires the images of a common working volume, i.e., the scene 103. When acquiring tile images 101, different parts of the object are occluded in the various images. This enables tile use of synthetic aperture photography. In synthetic aperture photography, images are aligned to a given plane and then aggregated to approximate a camera with a relatively large aperture. A maximum aperture size is equal to tile length L of baseline of the linear array of cameras 102. Therefore, it is possible to construct images that correspond to much larger aperture sizes than images acquired with a single conventional camera.

Because of the large aperture, these synthetically constructed aperture images 115 have a very shallow depth of field, and occluders are 'blurred' significantly when the cameras are focused on the object. As an advantage, our method can track tile object even when each image only includes a very small part of the object.

Because tile scene 103 itself is not modeled, the method can work with complex, dynamic scenes, e.g., outdoor scene, and moving cameras. Conventional synthetic aperture has been used for 'seeing through' occluders, but not for tracking a moving object.

Synthetic Aperture Tracking

As shown in FIG. 1, the method 100 operates by matching on synthetic aperture images. When one of these images is focused at a depth of the object, potential occluders at different depths are severely defocused or 'blurred'. If this depth difference is significant, for the given baseline L of the linear array of cameras 102, the occluders appear transparent.

The object is tracked by determining the synthetic aperture images 115 for a range of depths centered near the depth (d) obtained from previous images. Then, we perform matching between the synthetic aperture images for windows centered near the 2D location of the object in the previous image and select the 3D positions of the object that matches best, i.e., a particular 2D location and a particular depth with the maximal score.

Specifically, the linear array of N cameras 102 acquires the sequences of images 101. At a time instance there are a set of N synchronized images $\{I^i\}_{i=1}^{N}$ 101

A warping function $f(I^i, P_i, d)$ aligns each image $I^i$ in the set to a particular depth d, where a projection matrix for each camera is $P_i$. The depth aligned image is $$I^i_d = f(I^i, i, d). \quad (1)$$

The warped, and depth aligned images are aggregated 300 to determine the synthetic aperture images 115

$$I_d = 1/N \Sigma I^i_d. \quad (2)$$

The embodiments of the invention use eigenspaces to model the appearance of the object. The eigenspace corresponding to a given eigenvalue of a linear transformation is tile vector space of all eigenvectors with that eigenvalue.

Therefore, for the eigenspace it, we define a matching function, $T(I, \tilde{u}, x, y)$, that returns a scalar score for the fixed size tracking window centered at an image location (x, y) according to how well the pixels corresponding to the tracking window matches the eigenspace. The matching function is described in greater detail below.

Given a finite search range of multiple 2D window locations (x, y) and multiple depths (d), $$\Omega = (x_{[min,max]}, y_{[min,max]}, d_{[min,max]}),$$

where min and max indicated the extent of the search range.

The goal is to find a maximal score in the 3D spatio-depth search volume $$(x_m, y_m, d_m) = \underset{(x,y,d) \in \Omega}{\operatorname{argmax}} \{T(I_d, \tilde{u}, x, y)\} \quad (3)$$

$$= \underset{(x,y,d) \in \Omega}{\operatorname{argmax}} \left\{ T\left(\frac{1}{N} \sum I^i_d, \tilde{u}, x, y\right) \right\}.$$

The maximal (m) score corresponds to the tracked positions of the moving object $(x_m, y_m, d_m)$.

FIG. 1 shows the steps of the first method in greater detail. The sequences of images $I_j$ (video) 101 is acquired by the linear array of cameras 102, e.g., eight cameras. Initialization 105 is performed for the first image, j=0 of a generally centrally located camera. The initialization specifies the 2D window for the first set of images in the sequences. This can be done by a user, or using some known object recognition procedure. The initial depth can then be determined automatically using disparity. Disparity is a measure of difference in lie N images the set. The disparity can be used to determine the initial depth of the object and the initial synthetic aperture image 115, which is an initial basis image in the eigenspace. An occluded flag is set to be unoccluded.

Then, for each next set of images 101 from j=1 to k, determine 110 the synthetic aperture images 115 for a range of depths centered near the depth of the previous set of images. For each of these images 115, we determine 120 the match scores 125 to the eigenspace for the 2D tracking windows. We set 130 the new positions (x, y, depth) 135 of the object to be the window with the maximal match score. We scale 140 the 2D window and the basis images 145 to account for any change in depth. We project 150 the scaled window to each camera to get N images of the target for the current image, and determine the variance 155 across these images. If the variance is lower than a predetermined threshold, then object is unoccluded and update 160 the eigenspace with the synthetic aperture image of the object. In any case, proceed by processing the next set of images.

Matching

In object tracking, the goal to find the 3D positions in a image that minimizes a distance to the appearance model that is in the form of the eigenspace ũ. The matching function, T(I, ũ, x, y), determines the match scores 125 according to the distance from the eigenspace. This score is determined by projecting the image data (pixels) to the eigenspace. Specifically, pixels corresponding to the tracking window are x in a vector form, and eigenvectors $\tilde{u} = [u_l, \ldots, u_k]$, it is desired to minimize $$O(x) = \|\tilde{u} - x\|^2.$$

The outliers, i.e., presumed occlusions, are down-weighted by minimizing a 'minimax' robust norm, using the well known Huber iterative reweighed least squares (IRLS) process. A diagonal weight matrix w is initialized to the identity matrix. It is desired to minimize $$O_W(x) = \|wu\lambda - wx\|^2.$$

A residual vector is $r = u\lambda - x$. After one iteration of solving the weighted least-squares problem, before each new iteration, the weight matrix is updated as follows $$w_{ii} = \begin{cases} 1 & r_i < \Theta \\ \dfrac{\Theta}{r_i} & r_i \geq \Theta, \end{cases} \quad (5)$$

where Θ is set empirically to 0.05 for image data in a range [0, 1] and 0.5 for zero-mean, unit-variance normalized image data. Normalization is described below. When this process terminates, the sum of the resulting weights is the match score 135.

As inliers receive a weight of 1, and outliers are down-weighted, the sum of the weights is a quality measure of the number of inliers. The IRLS can be quite time consuming, however, we find that when using a binary weighting, i.e., $w_{ii} = 1$ when $r_i < \Theta$, and zero otherwise, the process can be accelerated. For nonlinear synthetic aperture tracking, representing occlusion as binary value is a reasonable approximation. Thus we use binary weights for the non-linear method as a speed optimization. Furthermore, we use a coarse-to-fine strategy to increase the speed of the matching process.

On-Line Learning in Occluded Scenes

The eigenspace model for the object is updated as the images are processed by adding image data for the object from tracked positions using incremental principal component analysis (PCA). The sixteen most significant eigenvectors are used as the basis. To limit drift in the on-line learning process, a template from the first image is stored. After each update, the orthogonal component of the template of from the first image is found with the updated basis, which then includes this orthogonal component as an additional basis vector. This ensures that the template from the first image is always in the basis.

To ensure that occluded pixels are outliers and therefore down-weighted during IRLS, the object and occluder must differ in appearance, and the eigenspace appearance model should only capture the appearance of the object. Thus, when performing on-line leaning, the eigenspace is only updated when there are no occlusions. The first image can be the initial training image when the object is unoccluded.

To determine whether the object is occluded or not, one can determine the per-pixel variance across all images for a particular image versus that of the first image. Because the depth and 2D location for the first image are initialized to the object across all N images, the variance per-pixel across all images is relatively low. In subsequent images, the variance can be high when the pixels are not well aligned due to occlusion, or due to tracking at an incorrect depth.

We consider any pixels with a variance less than $\gamma$ to be well-aligned and occlusion-free. We use $\gamma=500$. The variance data is on the order of $[0, 255]^2$. The number of occlusion-free pixels is stored for the first image. For any subsequent image this number is recomputed, and if the number is below a percentage threshold $\tau$, e.g., 95%, of the number of unoccluded pixels in the first image, we consider the object "occluded", and the occluded flag is set accordingly.

Specifically, the per-pixel variance for depth d is $$V_d = \frac{1}{N-1} \sum (I_d^i - I_d)^2. \quad (6)$$

where $I^i_d$ and $I_d$ are given by Equations (1) and (2). The occluded flag is updated after tracking a image k as such $$occluded_{k+1} = \left( \sum_{\Delta_k} \{V_d^k < \gamma\} < \tau \sum_{\Delta_1} \{V_d^1 < \gamma\} \right), \quad (7)$$

where $\Delta_k$ is the tracker window for the current image, $\Delta_1$ is the tracker window, and $V^1_d$ are the variances.

The eigenspace appearance model is trained, and matching is performed on RGB pixel values. The synthetic aperture tracking operates on zero-mean, unit-variance normalized image patches. This corrects for contrast loss that can occur due to blurred occluders. Consider the case of a blurred black occluder in a synthetic aperture image. Any pixel occluded in even one image is averaged with black while determining the synthetic aperture image. This "occluder haze" causes a loss of contrast. Working in a normalized space counteracts this.

Although the invention has been described by way of examples of preferred embodiments, it is to be understood that various other adaptations and modifications can be made within the spirit and scope of the invention. Therefore, it is the object of the appended claims to cover all such variations and modifications as come within the the spirit and scope of the invention.

We claim:

1. A computer implemented method for tracking 3D positions of an object moving in a scene, comprising the steps of:
    acquiring, with each camera of a set of cameras, a temporal sequence of images of a scene such that at each time instant a set of images is acquired of the scene, in which each image includes pixels;
    aggregating each set of images for each time instant into a synthetic aperture image including the pixels;
    matching, the pixels, in each set of images corresponding to multiple locations and multiple depths of a target window, with an appearance model to determine scores for the multiple locations and multiple depths; and
    selecting a particular location and a particular depth having a maximal score as a 3D position of the moving object.

2. The method of claim 1, further comprising:
    arranging the set of cameras in a linear array such that the set of cameras has a relatively large synthetic aperture.

3. The method of claim 2, in which a size of the aperture is equal to a length of a baseline of the set of cameras.

4. The method of claim 1, further comprising:
    synchronizing the set of cameras.

5. The method of claim 1, further comprising, in which the scene includes occlusions obscuring more than 50% of the scene.

6. The method of claim 1, further comprising:
    initializing the 2D location, the depth, and the appearance model from a first set of images acquired by the set of cameras.

7. The method of claim 1, in which the appearance model is in a form of an eigenspace.

8. The method of claim 1, further comprising:
    updating the appearance model for each set of images.

9. The method of claim 1, in which the multiple locations and multiple depths form a search range $$\Omega = (x_{[min,max]}, y_{[min,max]}, d_{[min,max]}),$$

where min and max indicated the extent of the search range.

10. The method of claim 9, in which the maximal score for the particular location and depth $$(x_m, y_m, d_m)$$

is $$\underset{(x,y,d)\in\Omega}{\mathrm{argmax}} \left\{ T\left( \frac{1}{N} \sum I_d^i, \tilde{u}, x, y \right) \right\},$$

where $I^i_d$ is the aggregated set of N images, T is a matching function, and $\tilde{u}$ is an eigenspace corresponding to the appearance model.

11. The method of claim 10, in which matching function minimizes $$O(x) = \|\tilde{u} - x\|^2,$$

where the pixels corresponding to the tracking window are x in a vector form.

12. The method of claim 9, in which the maximal score for the particular location and depth $(x_m, y_m, d_m)$ is $$\underset{(x,y,d)\in\Omega}{\operatorname{argmax}}\left\{\frac{1}{N}\sum\{T(I_d^i, \tilde{u}, x, y)\}\right\},$$

where $I_d^i$ is the aggregated set of N images, T is a matching function, and $\tilde{u}$ is an eigenspace corresponding to the appearance model.

13. The method of claim 12, in which matching function minimizes $$O(x) = \|\tilde{u} - x\|^2,$$

where the pixels corresponding to the tracking window are x in a vector form.

14. The method of claim 1, further comprising:
arranging the set of cameras in a grid such that the set of cameras has a relatively large synthetic aperture.

15. The method of claim 1, further comprising:
arranging the set of cameras as a cross pattern such that the set of cameras has a relatively large synthetic aperture.

16. The method of claim 1, in which the scene includes a participating media.

17. The method of claim 16, in which the participating media includes snow flakes.

18. The method of claim 16, in which the participating media forms occluders, and further comprising:
removing the occluders to deblur the sets of images.

* * * * *